US010262404B2

(12) United States Patent
Stancato et al.

(10) Patent No.: US 10,262,404 B2
(45) Date of Patent: Apr. 16, 2019

(54) METHOD AND SYSTEM FOR ARTICULATION OF A VISUAL INSPECTION DEVICE

(71) Applicant: General Electric Company, Schenectady, NY (US)

(72) Inventors: Nicholas Anthony Stancato, Skaneateles, NY (US); Melissa Rose Stancato, Skaneateles, NY (US); Kevin Andrew Coombs, Skaneateles, NY (US); Joseph John Waclawski, Skaneateles, NY (US); James J. Delmonico, Skaneateles, NY (US); Bryan David Maule, Skaneateles, NY (US); Dennis Lavin, Syracuse, NY (US); Matthew William Pankow, Skaneateles, NY (US)

(73) Assignee: General Electric Company, Schenectady, NY (US)

( * ) Notice: Subject to any disclaimer, the term of this patent is extended or adjusted under 35 U.S.C. 154(b) by 105 days.

(21) Appl. No.: 15/182,207

(22) Filed: Jun. 14, 2016

(65) Prior Publication Data

US 2017/0358072 A1    Dec. 14, 2017

(51) Int. Cl.
*H04N 7/18* (2006.01)
*G06T 7/00* (2017.01)
(Continued)

(52) U.S. Cl.
CPC ........ *G06T 7/0004* (2013.01); *G02B 23/2476* (2013.01); *H04N 5/23296* (2013.01); *G06T 2207/30164* (2013.01)

(58) Field of Classification Search
CPC ........................................... H04N 7/18
(Continued)

(56) References Cited

U.S. PATENT DOCUMENTS 9,036,892 B2    5/2015  Domke et al.
2011/0102586 A1  5/2011  Yang et al.
(Continued)

FOREIGN PATENT DOCUMENTS

EP    2 979 610 A1    2/2016
WO    03/083460 A1   10/2003

OTHER PUBLICATIONS

International Search Report and Written Opinion issued in connection with corresponding PCT Application No. PCT/US2017/37573 dated Sep. 12, 2017.
(Continued)

*Primary Examiner* — Jeffrey F Harold
*Assistant Examiner* — Sihar A Karwan
(74) *Attorney, Agent, or Firm* — Mintz Levin Cohn Ferris Glovsky and Popeo, P.C.

(57) ABSTRACT

Methods, systems, and computer-readable media for articulating visual inspection devices are provided. For example, a method can include receiving an inspection template by a control system associated with the visual inspection device. The inspection template can include data associated with at least one point of interest in a scene viewable to the visual inspection device. The method can further include generating, by the control system, an articulation path based on the data. The method can also include actuating an electromechanical system of the visual inspection device according to the articulation path.

20 Claims, 6 Drawing Sheets

(51) Int. Cl.
*H04N 5/232* (2006.01)
*G02B 23/24* (2006.01)

(58) Field of Classification Search
USPC .......................................... 348/125
See application file for complete search history.

(56) References Cited

U.S. PATENT DOCUMENTS

| | | |
|---|---|---|
| 2011/0149072 A1 | 6/2011 | McCormack |
| 2012/0330102 A1* | 12/2012 | Brennan ............ A61B 1/00096 |
| | | 600/177 |
| 2014/0198210 A1 | 7/2014 | Lee et al. |
| 2014/0207406 A1 | 7/2014 | Domke et al. |
| 2015/0012171 A1* | 1/2015 | Richter .................. G06T 7/001 |
| | | 701/32.9 |
| 2015/0029500 A1 | 1/2015 | Ward et al. |

OTHER PUBLICATIONS

Dong Yeop Kim et al., "Visual Testing System for the Damaged Area Detection of Windpower Plant Blade", 44th International Symposium on Robotics (ISR), 2013.

* cited by examiner

METHOD AND SYSTEM FOR ARTICULATION OF A VISUAL INSPECTION DEVICE

I. BACKGROUND

Visual inspection devices can be used to inspect industrial assets for wear or damage. Inspection typically requires an operator to document asset conditions utilizing still images and/or recorded video and/or measurement analyses. The documentation can include information about systems or subsystems of the asset that are damaged or require servicing. Still images and/or recorded video and/or measurement analyses can be useful, for decision makers and technicians, in scheduling repairs or maintenance. For example, historical image or video, or measurement data can help monitor equipment status over time.

Conventional visual inspections can be time consuming and error prone. For example, conventional inspection tasks are typically conducted by highly skilled technicians. Articulation paths taken by visual inspection devices can vary from one technician to the other, producing inconsistencies in the recorded inspection data. Specifically, ad-hoc or periodic manual inspections of particular assets can provide inconsistent historical data due to variations in the inspection path. Therefore, current visual inspection methods for monitoring industrial assets can suffer from a lack of standardization and reproducibility of inspection protocols.

Additionally, conventional visual inspection methods for industrial assets can be costly. A significant portion of these costs can occur when assets are taken offline to perform scheduled inspections. These conventional methods also typically require extensive training of operators, adding to the overall cost of asset monitoring.

II. SUMMARY

The present disclosure generally relates to industrial asset monitoring. In particular, the present disclosure relates to visual inspection methods and systems for industrial assets. Industrial assets can be equipment that are used in industrial settings. For example, an industrial asset can be a turbine blade, an engine, a turbine, a combustor, or any other piece of equipment requiring inspection and monitoring.

Furthermore, while some embodiments featured are herein are described in the context of visual inspection, other inspection methods, or multi-modal inspection methods are also contemplated. For example, the teachings featured herein can extend to combined ultrasonic and video borescope inspection systems.

Some embodiments can provide systems, methods, and apparatuses that streamline inspection processes by ensuring automatic or semi-manual articulation of visual inspection devices as well as accurate and repeatable inspection protocols. Furthermore, some embodiments can minimize asset down time by automating articulation, ensuring that all critical areas are inspected without assets needing to be offline. Some embodiments may further minimize asset down time and cost by reducing the number of skilled operators required to conduct a thorough inspection. Moreover, such reductions of asset downtime (for inspections) can enhance asset productivity.

For example, the embodiments can allow an inspector to focus their attention on the internal features of an asset rather than on the mechanics of navigating the visual inspection device. Furthermore, the embodiments can allow skilled operators to create, store and distribute guided inspection routines on the visual inspection device such that less skilled operators can accurately follow and perform repetitive inspections. Further still, the embodiments can permit the simultaneous control of multiple visual inspection devices to monitor more than one asset, in addition to allowing the simultaneous monitoring of different types of assets. Further still, the embodiments can permit the control of other ancillary inspection tools or devices as part of the inspection routine. For example, according to various aspects described herein, during articulation, a visual inspection device may trigger a turning tool to rotate the core of a turbine as part of an inspection routine.

Under certain circumstances, some embodiments can provide a method of articulating a visual inspection device. The method can include generating an inspection template having data associated with at least one point of interest in a scene viewable to the visual inspection device. The method can also include subsequently loading the inspection template into a memory of a control system associated with the visual inspection device and generating, by the control system, an articulation path based on the data. The inspection template can be located on a remote device or in a cloud environment, and the template can thus be accessed by the control system over a network. An electro-mechanical actuator of the visual inspection device can be actuated according to the articulation path.

Additional features, modes of operations, advantages, and other aspects of various embodiments are described below with reference to the accompanying drawings. It is noted that the present disclosure is not limited to the specific embodiments described herein. These embodiments are presented for illustrative purposes. Additional embodiments, or modifications of the embodiments disclosed, will be readily apparent to persons skilled in the relevant art(s) based on the teachings provided.

III. BRIEF DESCRIPTION OF THE DRAWINGS

Illustrative embodiments may take form in various components and arrangements of components. Illustrative embodiments are shown in the accompanying drawings, throughout which like reference numerals may indicate corresponding or similar parts in the various drawings. The drawings are for purposes of illustrating the embodiments and are not to be construed as limiting the disclosure. Given the following enabling description of the drawings, the novel aspects of the present disclosure should become evident to a person of ordinary skill in the relevant art(s).

IV. DETAILED DESCRIPTION

While the illustrative embodiments are described herein for particular applications, it should be understood that the present disclosure is not limited thereto. Those skilled in the art and with access to the teachings provided herein will recognize additional applications, modifications, and embodiments within the scope thereof and additional fields in which the present disclosure would be of significant utility.

Video inspection devices, such as video borescopes, can be used to inspect the inside of machinery such as turbines and engines. The inspection devices can include a long probe that is inserted into the machine under inspection. In order to help insert the probe inside the machine and to help the inspection process, the end of the probe can typically be articulated using a joystick operated by a technician. In some embodiments, the inspection device can use an inspection template that is specific to the machine under inspection. The inspection template can include instructions that can be used to automatically articulate the probe. As the probe is inserted into the machine being inspected, the inspection device can automatically articulate the probe to the desired position based on the instructions in the inspection template, reducing the need for the technician to do so. Other embodiments are within the scope of the disclosure.

Figure 1:
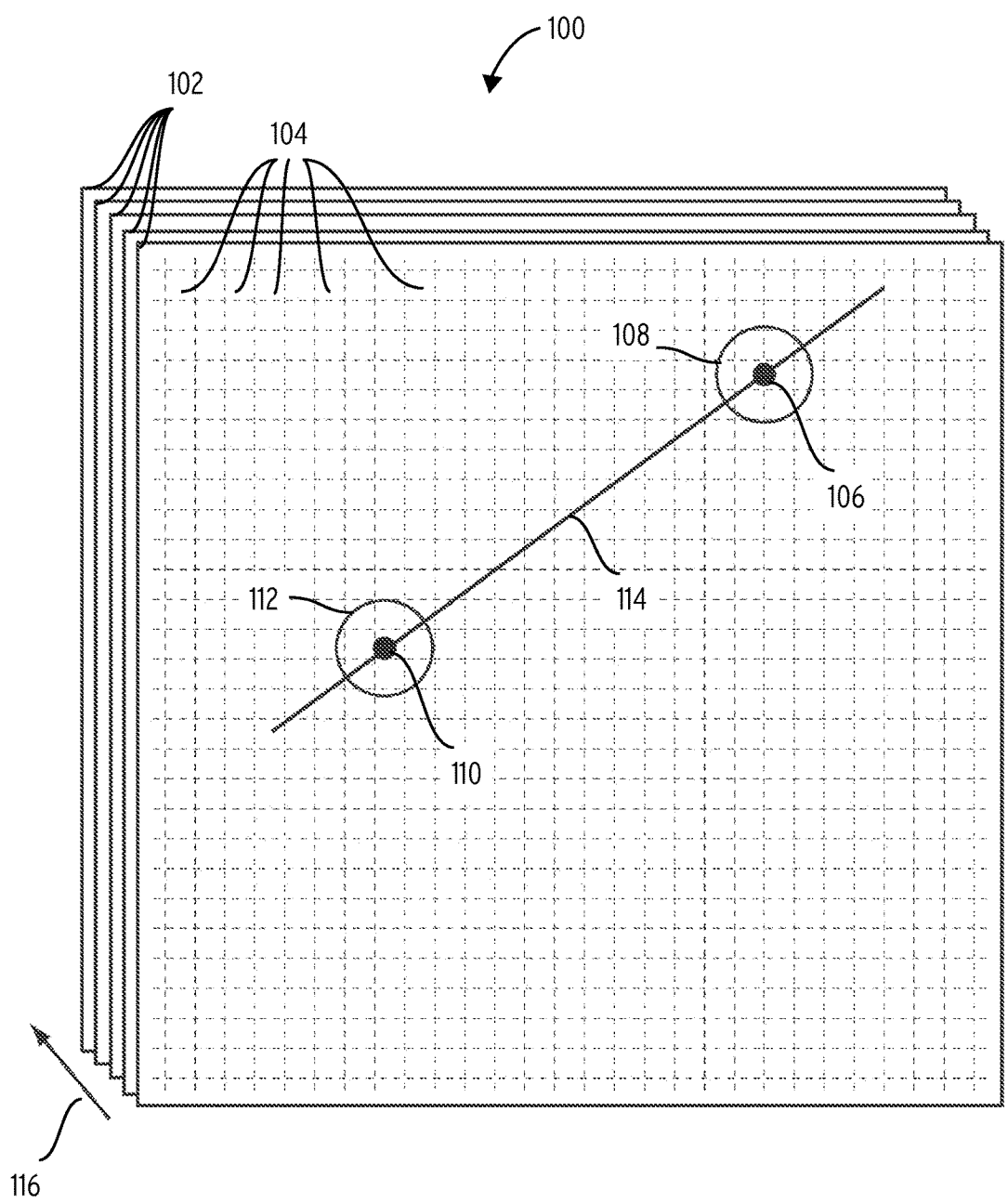
FIG. 1 illustrates a scene viewable by a visual inspection device, according to an embodiment.

FIG. 1 illustrates a scene 100 viewable by a visual inspection device, according to an embodiment. The visual inspection device can be an endoscope, borescope, videoscope or a pan-tilt-zoom (PTZ) camera. For example, the visual inspection device can be a borescope system similar to that shown in FIG. 3 of U.S. Pat. No. 9,036,892, issued May 19, 2015 and incorporated herein by reference in its entirety.

Generally, the visual inspection device can be any system capable of providing still image and/or video data.

The visual inspection device can be coupled to a turning tool system including an electro-mechanical actuator that repositions and/or reconfigures the asset upon receiving a signal from the visual inspection device. Repositioning the visual inspection device can also include actuating the visual inspection device to a specified set of x, y, and z coordinates. Reconfiguring the visual inspection device can include setting various predetermined imaging parameters such as light intensity of a light source associated with the visual inspection device to illuminate and view a scene 100 at a desired light level.

Configuring the visual inspection device can include setting a specified zoom for the device. For example, for a PTZ camera, positioning and configuring can include setting a specified set of pan, tilt, and zoom and lighting conditions for the camera. For a videoscope, positioning and configuring may include setting articulation/navigation coordinates, as well as setting light intensity, and the degree of zoom, for the videoscope.

In one embodiment, the visual inspection device can acquire video and/or still images related to the scene 100. In FIG. 1, these data are represented digitally in a memory of the visual inspection device or its control system. For example, the data can be represented as a plurality of frames 102, each frame being a digital image. This digital image can be constructed from reading a value from each pixel, of a plurality of pixels 104, of an image sensor of the visual inspection device.

Each of the frames 102 can correspond to one image obtained at a specific position of the visual inspection device. For video data, the frames 102 can be indexed chronologically according to a time axis 116. As such, the video data can be reconstructed by playing the frames in time, according to the time axis 116.

In one embodiment, one or more of the frames 102 can be viewed on a graphical user interface (GUI) associated with a human machine interface (HMI) of the visual inspection device. For example, in some embodiments, the HMI can be a touchscreen of a control system associated with the visual inspection device. The GUI can be one or more software applications being executed by a processor of the control system to allow a user to view video and/or still images acquired by the visual inspection device.

A user can select one of the frames 102 and mark two points of interest in the image of the selected frame. For example, in FIG. 1, a user can select a point 106 and a point 110 as being the two points of interest. In other embodiments, a group of pixels 104 can be selected around specific points of interest. For example, a neighborhood 108 of the point 106 can be selected as a region of interest. Similarly, a neighborhood 112 of the point 110 can be selected as another region of interest. The points 106 and 110 can also be selected based on three-dimensional locations, i.e. based on their respective x and y coordinates on their respective z coordinates obtained from a known point of reference.

Upon selecting these two points, the control system can automatically generate a template. That is, the control system can generate a set of instructions and/or settings useful for articulating the visual inspection device. Articulation can occur along a path 114, extending from the point 106 to the point 110, or vice versa. In addition to generating instructions, the control system can also index absolute positioning and configuration data of the visual inspection device for the frame on which the points of interest are selected. In this manner, rather than being absolute, the positioning data can be relative to a point of reference in the scene.

Generally, the operator may need to define an articulation path between points A and B. For example, the asset being monitored can be a turbine blade having a curved leading/trailing edge. As such, the control system can automatically define a curved articulation path between points A and B, following the curved leading/trailing edge of the turbine blade on the selected image. Furthermore, the control system can record the servo (i.e. the electro-mechanical actuator supporting the visual inspection device) motion against time to define the curved articulation path.

Consequently, when the template is executed by the control system, the visual inspection device can be positioned and configured as it was when the frame associated with the template was acquired. The visual inspection device can provide visual aids to the operator to allow the operator to initially position the inspection device, and/or can automatically compensate for deviations from a proper initial positioning. An example of a visual aid may be a semi-transparent image for the operator to match, or visual cues such as directional arrows that can be superimposed on the selected frame 102. As a result, the visual inspection device can be articulated from a first point of interest to a second point of interest, along a specific path between the two points of interest, after being positioned at a point of reference.

In the above-described embodiment, when two points or regions of interest are selected, the control system can automatically define the path 114 as being the shortest articulation path between the two points or regions. Accordingly, the path 114 can be a linear path extending between the two points or regions. Alternatively, rather than shortest path, the template could include other path defining boundary conditions; e.g., bypassing/avoiding certain path features. As shall be seen below, an articulation path can be a non-linear path.

In a particular application, the path 114 can be a segment associated with a particular subsystem of a piece of equipment. For example, the point 106 can be in a first region of a turbine blade and the point 110 can be in a second region of the turbine blade. In this manner, the path 114 can be the segment between those two points on the turbine blade.

Thus, in this example, the embodiment can allow selection of the two points of interest and the visual inspection device can be articulated across the path 114 to provide video or still images, along the path 114. The template can be reloaded at a subsequent time and the visual inspection device can articulate across the same path 114.

The embodiments described herein provide several improvements to computerized inspection system. For example, the embodiment depicted in FIG. 1 can facilitate inspection repeatability since the visual inspection device can be articulated precisely across the same path every time the template is used. These advantages not only reduce inspection time and variability, they also reduce costs—eliminating the need for a highly skilled operator to conduct inspection.

Figure 2:
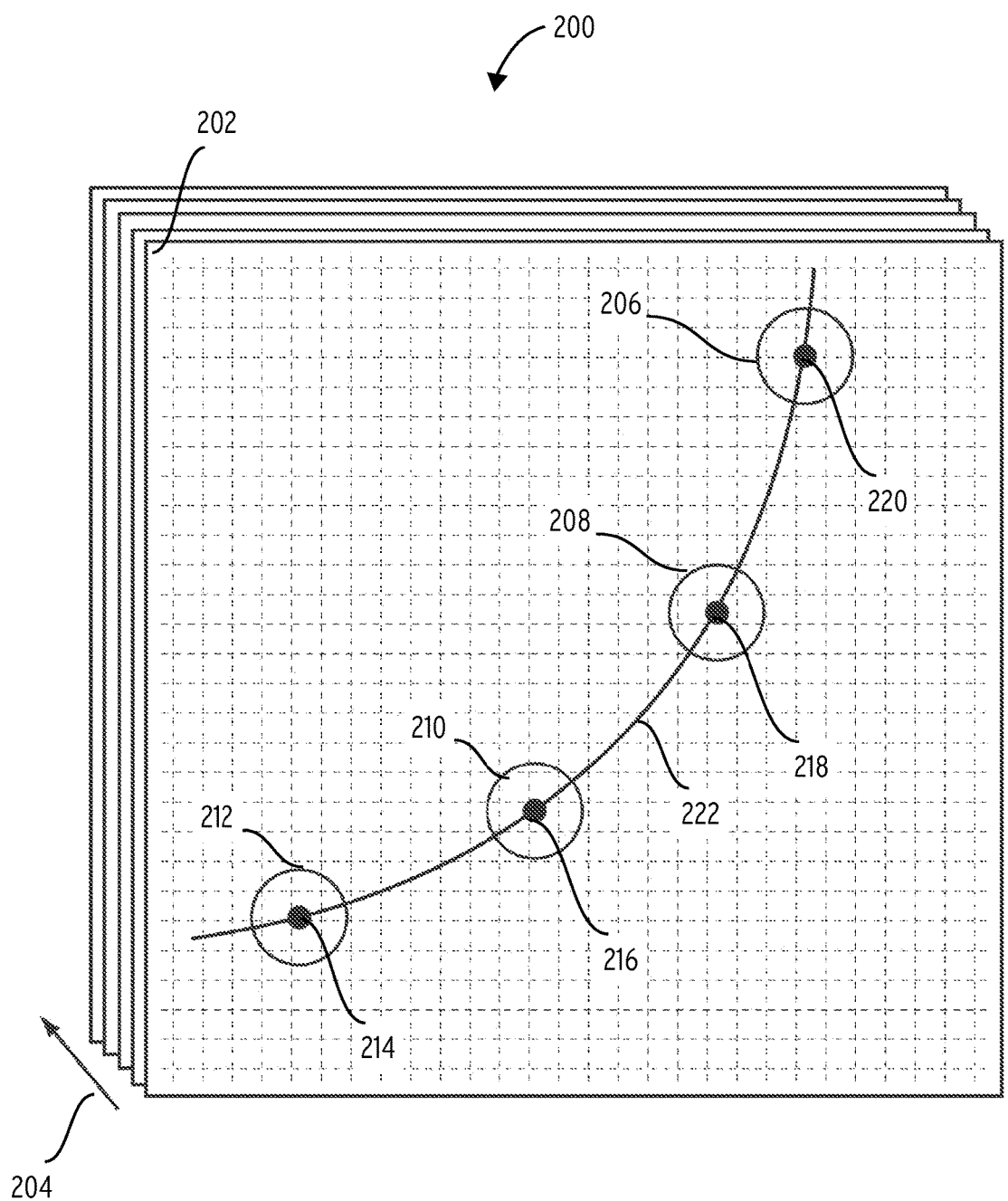
FIG. 2 illustrates a scene viewable by a visual inspection device, according to an embodiment.

FIG. 2 illustrates a scene 200 viewable by a visual inspection device according to another embodiment. In FIG. 2, a user can select a single frame from a plurality of frames 202 stored according to a chronological time axis 204. In the selected frame, the user can select a plurality of points of interest in the image of the selected frame to create a custom path. As described previously, any suitable HMI/GUI can be used to enable the user to mark the points of interest in the image of the selected frame. Accordingly, instead of points of interest, regions of interest can be selected (e.g. neighborhoods 206, 208, 210, and 212).

By way of example, a user can select points 214, 216, 218, and 220, effectively creating a path 222 for inspection. As such, the path 222 can be saved in a template including instructions for automatically articulating the visual inspection device along path 222. The path 222 can be specific to an equipment, as in the case of path 114.

In alternate embodiments, with respect to FIGS. 1 and 2, selection of points or regions of interest can be achieved automatically, rather than by an operator of the visual inspection device. For example, computer-aided-design (CAD) models can be fed to the control system of the visual inspection device. Using image recognition software, the control system can identify and select one or more points (or regions) of interest.

The control system can then automatically provide an inspection path along which the visual inspection device can be automatically articulated. Thus, in these alternate embodiments, the visual inspection device does not require user point of interest selection to program the inspection path. Alternatively, an operator without access to a physical asset can manually program the inspection path from a CAD model by selecting one or more points of interest in a specified path.

Additionally, with respect to FIGS. 1 and 2, once points or regions of interest are selected, a turning tool inspection sequence can be triggered. This triggering can enable the visual inspection device to be operated automatically along the generated path. For example, when the visual inspection device is a videoscope, the turning tool start/stop sequences can trigger the commencement of automated articulation. The articulation can be halted by detecting when the image ceases to move, or by using optic flow detection techniques.

In the embodiments, a user can toggle between points of interest across one or more frames, and save/record/name the articulation path corresponding to the selected point of interest. This process can create an articulation program (or template) for future use.

The articulation program can be integrated into menu-directed inspection (MDI) applications currently used by visual inspection devices. Such integration can provide access to file naming and storing systems. As such, these systems can help create a database of equipment-specific and inspection task-specific articulation programs. Additional features can be included in the articulation programs, such as features that provide instructions for the speed of articulation between specific points of interest.

The embodiments provide several advantages and improvements to current hardware systems that run MDI applications. For example, once an articulation program is integrated in the MDI application, the devices controlled by the MDI application can follow standardized articulation paths, thus yielding reproducible data. In other words, the embodiments provide means for ensuring that every time an inspection is performed, the visual inspection device is actuated according to the same exact path, thus ensuring that the same inspection is provided every time an inspection is performed. In other embodiments, points of interest ranging across large articulation paths extending beyond the field of view of the visual inspection device can be accommodated.

In other embodiments, with respect to FIGS. 1 and 2, inspection can be performed at a neighborhood of at least one point of interest. In these embodiments, inspection does not occur along a path. Instead, inspection occurs at the neighborhood of the at least one point of interest.

In yet other embodiments, the control system of the visual inspection device may automatically load still images for purposes of 2D or 3D measurement analysis at certain points of interest, during the articulation routine. For example, during an automated turbine blade inspection, the control system may be programmed to perform an automated blade tip to engine shroud clearance measurement, at some point along the articulation path. In another example, the control system can perform the stitching of overlapping images to create one large image in order to pre-programing complex articulation paths.

Figure 3:
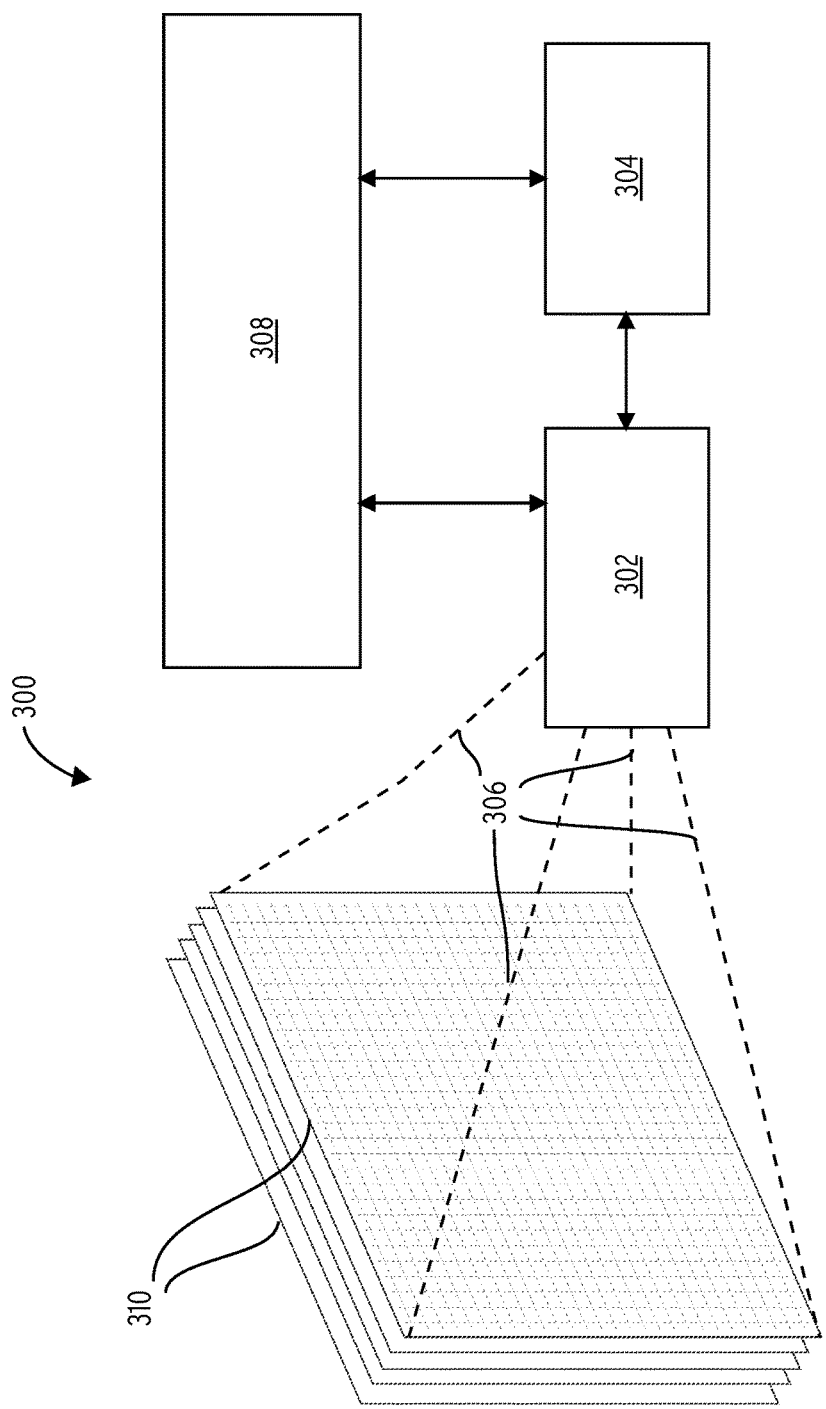
FIG. 3 illustrates a block diagram of a system, according to an embodiment.

FIG. 3 illustrates a system 300, according to embodiments. System 300 can include a control system 308 communicatively coupled to a visual inspection device 302 and its associated electro-mechanical actuator 304. The visual inspection device 302, the electro-mechanical actuator 304, and the control system 308 can be co-located in a single device. Alternatively, the control system 308 can be remotely located from the visual inspection device 302 and the electro-mechanical actuator 304. The visual inspection device 302 can have a field of view defined by the solid angle subtended by the lines 306.

The visual inspection device 302 can include an image sensor capable of acquiring a still image or video data of a scene located in its field of view. For example, such a scene can be represented in a memory of the control system 308 as a plurality of frames 310, as depicted in FIG. 3. Each of the frames 310 can be acquired as the visual inspection device 302 moves or remains stationary. Acquired frames can be associated, in memory, with position and configuration data of the visual inspection device 302 as well as with acquisition time.

The control system 308 can include an HMI that allows users to select specific frames to mark points or regions of interest and to define specific articulation paths. Additionally, the control system 308 can include a processor programmable to monitor articulation of the visual inspection device 302. The processor can record position, speed, and configuration data of the visual inspection device 302 in a memory. This recording can occur as the visual inspection device 302 articulates across the specific articulation path provided in the predefined template.

The control system 308 can also include software for reversing articulation and data acquisition along a specific articulation path or at specific points of interest. That is, the control system 308 can have an ability to perform "undo" operations. For example, an operator can return to a location where the visual inspection device 302 had previously been articulated and/or where it acquired data.

For example, articulation can occur along a specific articulation path. Commands received from the control system 308 to the electro-mechanical actuator 304, triggering articulation, are storable in memory. The commands can also be indexed in the order they were issued (or received). When an undo command is selected from the control software executing on the control system 308, responsive to the command, the visual inspection device 302 can reverse the order in which the articulation previously occurred. As a result, the operator can retrace articulation steps and re-inspect along the path, if needed.

In another embodiment, as the visual inspection device 302 articulates along a specific path, all position data, configuration data, and articulation times can be saved in the memory of the control system 308. The operator can then elect to undo and go back in time. For example, the operator can go back 5, 10, 15, or 30 seconds in the past. Upon issuing such an undo command, the visual inspection device 302 can automatically return to the position and configuration settings corresponding to the time selected by the operator.

In yet another embodiment, when articulation ceases (i.e., when the visual inspection device 302 is articulated to move from one point to another in a plurality of points of interest), still images can be captured at each point. This process can yield N images, each corresponding to a specific point of interest at which articulation stopped. (N is a natural number greater than zero.) Each of the N images can be stored with corresponding configuration and position data of the visual inspection device 302.

For example, x, y, z locations of a head of a videoscope can be saved with each image saved. In some embodiments, however, the x, y, z locations of the head need not be known. Rather, configuration values of the electro-mechanical actuator(s) of the videoscope (i.e. the servos or servo motors) that are responsible for actuating the head can be saved.

In either case, an operator can subsequently call up a set of thumbnails that indicate the last N locations visited (i.e. locations associated with each one of the N images). The operator can return to any of the desired images, and direct the control system 308 to position and configure the visual inspection device 302 as it was when the one image was acquired.

In another arrangement, the control system 308 can be programmed to return to previous positions and configurations from recorded video data. For example, for recorded video, each of frames 310 can be stored with configuration and position data. As the recorded inspection section is played back, an operator can select a particular frame in the playback video to return to and to re-inspect in a live-video mode.

In the embodiments above, although undo operations are described, "redo" operations are also contemplated. That is, the embodiments can also provide the ability to move forward after effecting an undo operation. While articulation is described as being automatically performed using a pre-programmed articulation template, undo and redo operations for completely manual articulations are also contemplated.

In some embodiments, manual operation can be performed, for example, using a joystick device associated with the control system 308.

Figure 4:
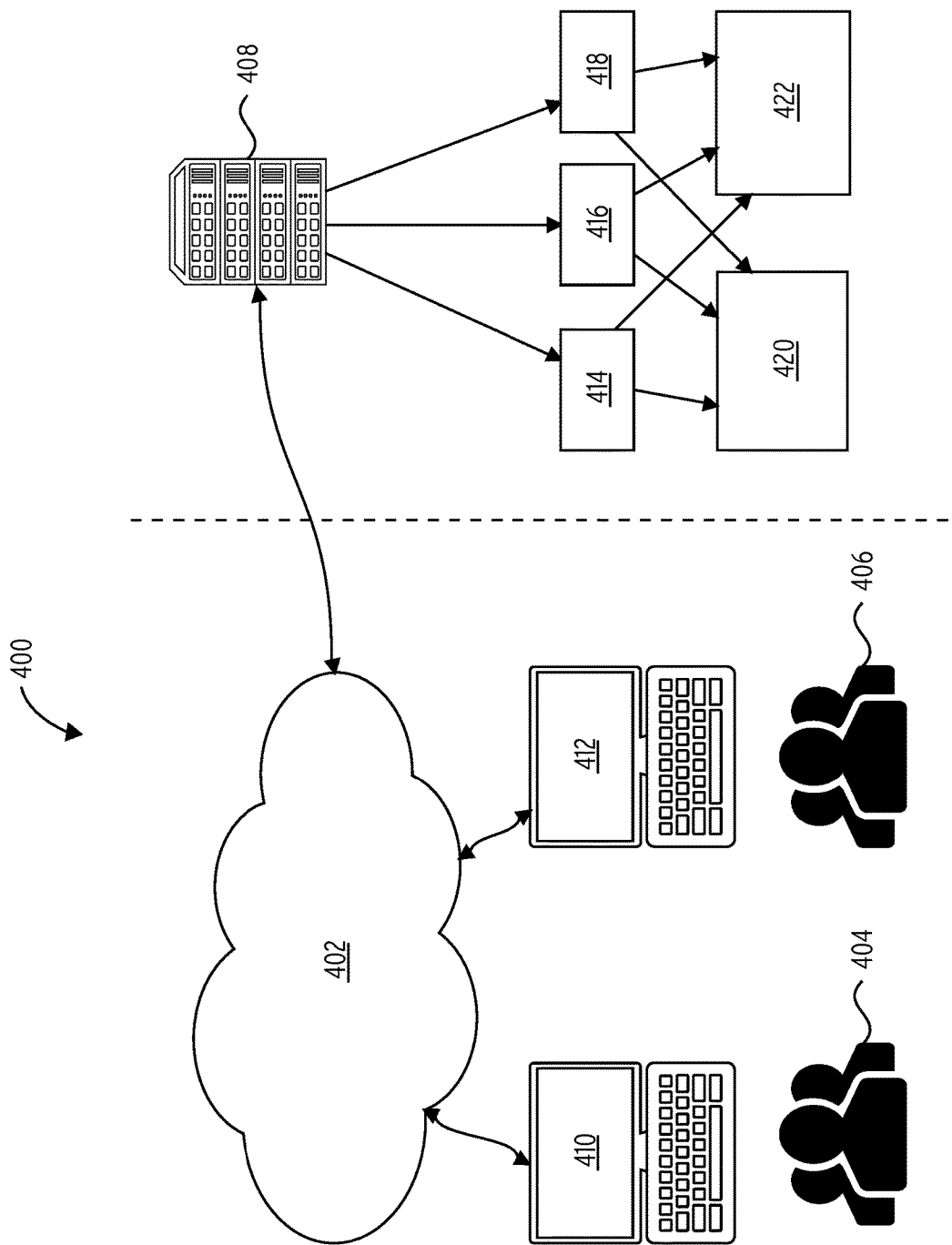
FIG. 4 illustrates a system, according to an embodiment.

FIG. 4 illustrates a system 400, according to embodiments. System 400 can include a plurality of visual inspection devices, of which visual inspection devices 420 and 422 are shown. Each visual inspection device can be associated with an electro-mechanical actuator or turning tool system (not shown). Each visual inspection device can be controlled via one of control systems 414, 416, and 418. In the example of FIG. 4, only three control systems are shown. However, in some arrangements, only one control system can control each visual inspection device. Furthermore, control of the different visual inspection devices can be achieved independently, sequentially, or simultaneously.

Operators 404 and 406 can interface with the visual inspection devices 420 and 422 via a network 402 and through a server 408. Any of the operators can generate inspection templates by training any one of visual inspection device 420 and visual inspection device 422. Complex inspection tasks involving one or more visual inspection devices can be loaded in server 408 and scheduled for execution. Using computing device 410, or a computing device 412, the operators can remotely generate templates and/or manually articulate (via a joystick for example) any one visual inspection devices 420 and 422.

The embodiments provide the ability to remotely plan, distribute, and schedule inspection tasks, without sacrificing reproducibility and accuracy in inspection. Specific articulation templates can be programmed for specific equipment. For example, an articulation template specific to a turbine can be programmed in server 408, and an articulation template specific to a combustor can be programmed in server 408.

Template generation, execution, undo, and redo operations can occur remotely and be associated with a plurality of visual inspection devices, control systems, articulation hardware, and equipment. Furthermore, the embodiments can extend to any type of visual inspection device, and particularly to electro-mechanically controlled videoscopes and PTZ cameras and camera systems.

Figure 5:
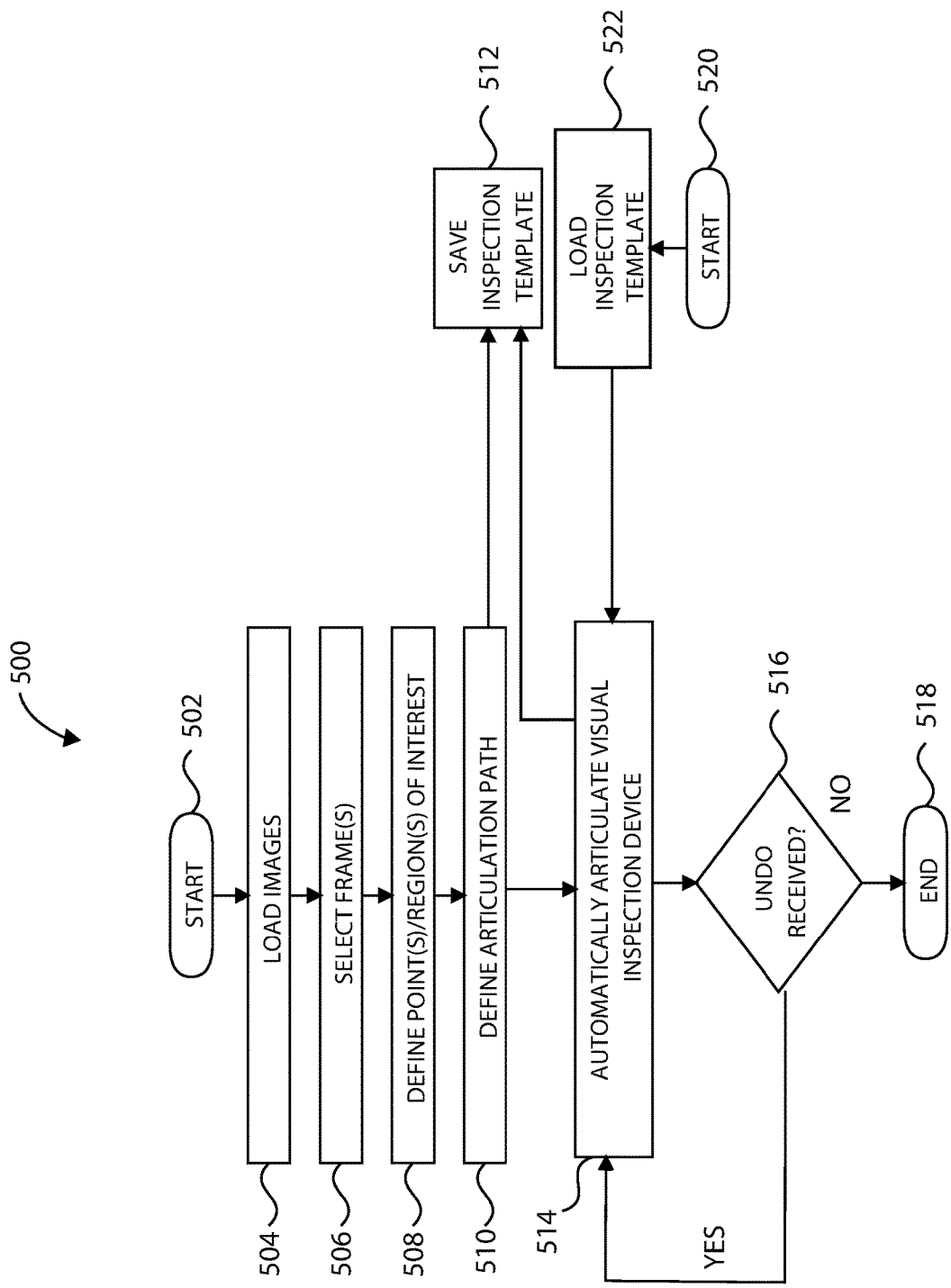
FIG. 5 illustrates a method according to an embodiment.

Having set forth various embodiments, a method 500 describing an exemplary operation is now described in FIG. 5. The method 500 can begin at a start block 502 or it can begin at a start block 520.

When the method 500 begins at the start block 502, images pre-recorded during inspection of an asset are loaded into the memory of a control system coupled to a visual inspection device associated with the asset (block 504). Alternatively, the images can be communicated to the control system remotely or the control system can fetch the images from a remote server or a peripheral device, upon initialization, i.e. upon the method 500 beginning at the start block 502.

The images can be digital images, and they can be saved in a memory of the control system or on a remote server or peripheral device in one or more image file formats known in the art. For example, and not by limitation, the one or more images can be in file formats having extension selected from formats including .jpg, .bmp, .tiff, .png, or the like. Moreover, in alternate embodiments, instead of images, the control system can make use of pre-saved CAD models, which can be in one or more file formats known in the art. Again, for example and not by limitation, these formats can be .dwg or .dxf formats or the like. In yet other embodiments, the control system can make use of pre-recorded video files, which can be in any video file format known in the art (e.g. .mpg, .avi, .dvi, or the like).

In one embodiment, an operator can select one or more frames of interest (block 506). For example, a frame of interest can be a still image in the plurality of images that are loaded at block 504. The frames of interest can also be selected as specific video frames when a pre-recorded video is loaded at block 504. Moreover, in the case of CAD models being loaded, an operator can select a specific region of the CAD model, or one or more of the CAD models as a whole as being the frame of interest.

Selection of the frames of interest as described above can be performed via an HMI/GUI system of the control system. For example, the operator can view a plurality of images on a screen in the forms of thumbnails and subsequently select one or more images from the plurality of images for further processing. Similarly, CAD models and pre-recorded videos can be loaded, viewed, previewed, and subsequently selected on a GUI of the control system via an HMI of the control system. An HMI can be a mouse, a touch screen, a voice activated command interface, or any other HMI means.

Once the frames of interest are selected, a user can define specific points or regions in each one of the frames selected (block 508). Selection and definition of points or regions (as shown in FIGS. 1 and 2) can be performed by clicking on the desired points or regions in a loaded image (at block 504), or a user can simply enter known coordinates associated with the frames. In alternate embodiments, a coordinates list can be provided to the control system, and points or regions can be defined automatically by the control system, without an intervening user. For example, coordinates can be associated with specific frames and points or regions of interest and they can be marked by the control system on the images, once they images are selected.

Once points and regions are defined, the control system may automatically define an articulation path for the visual inspection device (block 510). For example, for a given frame of interest, the control system may define a path associated with two or more points of interest by performing a fitting operation between the two or more points. The control system may perform a fitting operation that includes a least squares fit between the points of interest, or a polynomial fit, or the like. Alternatively, a user can draw or define a path via the HMI, for example, by tracing a line between the points of interest on one of the selected images.

The articulation path, following its definition, can be stored in a template (block 512). Generally, the articulation path can be preserved in memory, either locally on the control system or remotely, at a server or database communicatively coupled to the control system. The template can be a file, and it can be stored according to known file system and data storage practice. The template can include information associated with the articulation path, such as a set of coordinates giving the positioning of the visual inspection device as it would articulate along the defined path. Alternatively, or in addition, a set of servo settings corresponding to a servo motor of the visual inspection device as it actuates along the articulation path (block 514) can be included in the template.

The template can further include configuration data (e.g. zoom settings of the visual inspection device). The inspection template can also include annotations and data specific to the asset being monitored, such as CAD models, serial number, historical inspection data, and the like. The template can be specific to the asset that is being monitored. Specificity to the asset can be included either in the file name, or by including in the file, an identifier associated with the asset.

The control system can issue commands to actuate an electro-mechanical actuator of the visual inspection device to position and configure the visual inspection device according to the defined articulation path (block 514). This can be done by converting or associating the coordinates or the servo settings to actuation instructions configured to cause the visual inspection device to be actuated. Furthermore, when an undo command is received by the control system (decision block 516), the control system can reverse the articulation of the visual inspection device along a previously taken articulation path, and the method 500 can revert to block 514. If no undo command is received, the method 500 can end at block 518.

When the method 500 begins at the start block 520, a pre-programmed template already exists, and it can be loaded into the memory of the control system in order to cause articulation to occur according to the path defined in the loaded template (block 522). In some embodiments, loading the inspection template can include loading the data in the template in an MDI application being executed on the control system. Articulation can then proceed at block 514, as described above, and the method 500 can end at block 518.

One of skill in the art will recognize that the method 500 can be a computerized method that can be executed either in part or in whole, without departing from the scope of the teachings described throughout this disclosure. Furthermore, the method 500 can be executed sequentially or in parallel (in part or in whole) for a plurality of assets, thereby allowing precise and standardized monitoring of a plurality of assets.

Figure 6:
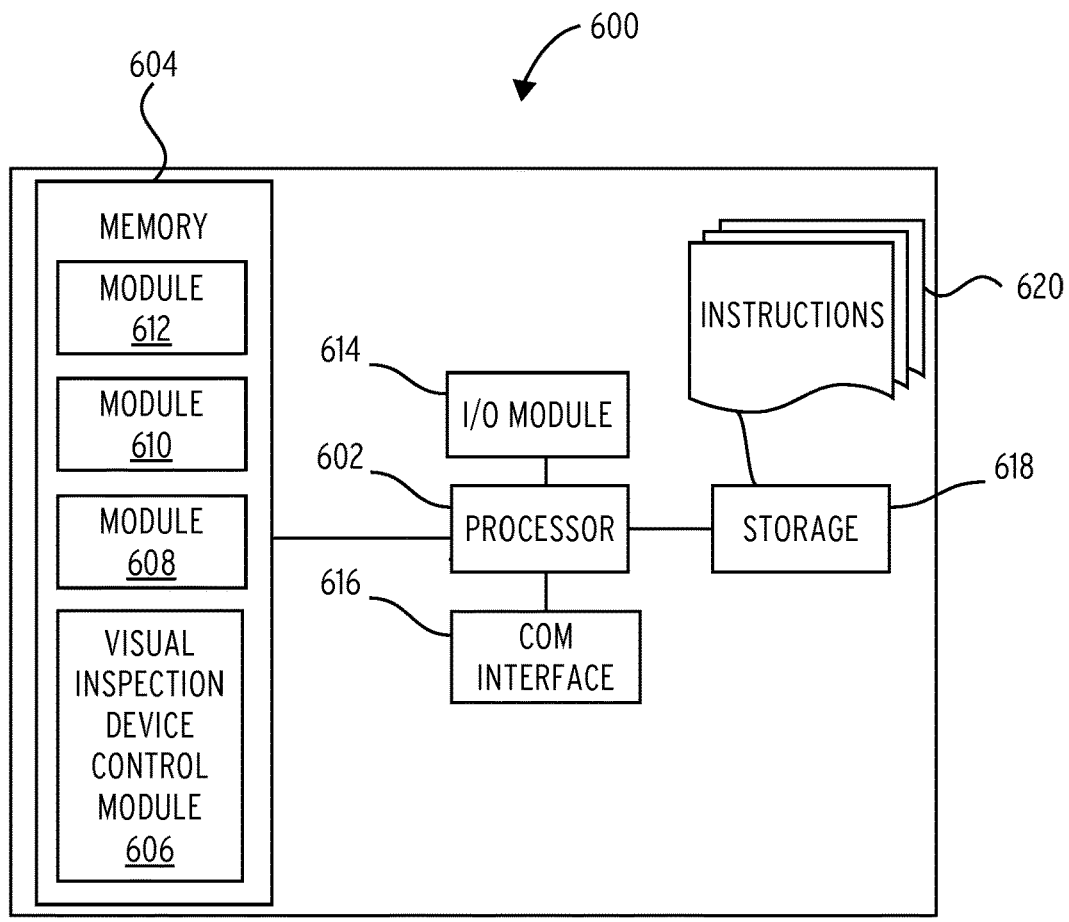
FIG. 6 illustrates a block diagram of a device, according to an embodiment.

FIG. 6 illustrates a controller 600 (or system), according to the embodiments. The controller 600 can include a processor 602 having a specific structure. The specific structure can be imparted to the processor 602 by instructions stored in a memory 604 and/or by instructions 620 fetchable by the processor 602 from a storage medium 618. The storage medium 618 may be co-located with the controller 600 as shown, or it can be remote and communicatively coupled to the controller 600. Such communications can be encrypted.

The controller 600 can be a stand-alone programmable system, or a programmable module included in a larger system. For example, the controller 600 can be included in the control system 308 described previously.

The controller 600 may include one or more hardware and/or software components configured to fetch, decode, execute, store, analyze, distribute, evaluate, and/or categorize information. Furthermore, controller 600 includes an input/output (I/O) module 614 configured to interface with a plurality of visual inspection devices and their associated electro-mechanical actuation systems.

The processor 602 may include one or more processing devices or cores (not shown). In some embodiments, the processor 602 may be a plurality of processors, each having either one or more cores. The processor 602 can execute instructions fetched from the memory 604, i.e. from one of memory modules 612, 610, 608, or 606. Alternatively, the instructions can be fetched from the storage medium 618, or from a remote device connected to the controller 600 via a communication interface 616 (see FIG. 4, for example).

Without loss of generality, the storage medium 618 and/or the memory 604 can include a volatile or non-volatile, magnetic, semiconductor, tape, optical, removable, nonremovable, read-only, random-access, or any type of non-transitory computer-readable computer medium. The storage medium 618 and/or the memory 604 may include programs and/or other information usable by processor 602. Furthermore, the storage medium 618 can be configured to log data processed, recorded, or collected during the operation of controller 600. The data may be time-stamped, location-stamped, cataloged, indexed, encrypted, and/or organized in a variety of ways consistent with data storage practice.

By way of example, the memory module 606 can be a visual inspection device control module, and it can include instructions that, when executed by processor 602, cause processor 602 to perform certain operations to control the visual inspection device. The operations can include generating an inspection template and subsequently loading the inspection template into the memory 604. The operations can further include generating an articulation path based on the data, and actuating an electro-mechanical system of the visual inspection device according to the articulation path. Generally, the operations can include any tasks, operations, and/or steps described previously in the context of FIGS. 1-5.

Those skilled in the relevant art(s) will appreciate that various adaptations and modifications of the embodiments described above can be configured without departing from the scope and spirit of the disclosure. For example, while the embodiments are described in the context of inspecting industrial assets, the teachings featured herein can be adapted and extend to aerial vehicles bearing visual inspection devices. Specifically, the embodiments featured herein can be used to provide repeatable and reproducible flight paths based on video or still images acquired by the visual inspection device of an aerial vehicle. In general, the teaching of the present disclosure apply to drones or embedded systems that include vision systems.

Therefore, it is to be understood that, within the scope of the appended claims, the teachings featured herein may be practiced other than as specifically described herein.

What is claimed is:

1. A method of articulating an inspection device, the method comprising:
    receiving, by a control system,
        an image captured by a visual inspection device that is related to a scene including an asset under inspection, and
        configuration and position data representing conditions under which the image is captured by the visual inspection device, the conditions including a predetermined position of the visual inspection device with respect to the asset, a predetermined light intensity of a light source associated with the visual inspection device, and a predetermined degree of zoom of the visual inspection device;
    receiving, by the control system, a selection of at least two points of interest within the image;
    generating by the control system, a set of instructions containing commands operative to actuate an actuator of the visual inspection device for positioning the visual inspection device during articulation along an articulation path extending from one to the other of the at least two selected points in the image;
    automatically generating, by the control system, an inspection template including the set of instructions, the predetermined light intensity; and the predetermined degree of zoom; and
    executing, by the control system, the inspection template, the executed inspection template causing,
        the actuator to position the visual inspection device at the predetermined position,
        the visual inspection device to adopt the predetermined degree of zoom,
        the light source to emit light at the predetermined light intensity, and
        the actuator to move the visual inspection device along the articulation path in a first direction, with the predetermined degree of zoom and predetermined light intensity, after being positioned at the predetermined position.

2. The method of claim 1, further comprising acquiring one of a still image and a video after the actuating and positioning the visual inspection device according to the articulation path.

3. The method of claim 1, further comprising incorporating the inspection template in a menu-directed inspection (MDI) application.

4. The method of claim 1, wherein the asset is a turbine and the executed inspection template further causes a turning tool to rotate a core of the turbine concurrently with actuation of the visual inspection device.

5. The method of claim 1, wherein the inspection template further includes instructions associated with navigating the visual inspection device to a point of a reference prior to actuation of the visual inspection device.

6. The method of claim 5, wherein the visual inspection device is one of a pan-tilt-zoom camera and a videoscope.

7. The method of claim 1, further comprising receiving an undo command by the control system and further comprising articulating the visual inspection device along the articulation path in a second direction, opposite the first direction.

8. A system for articulating a visual inspection device, comprising:
    a processor;
    a non-transitory memory comprising instructions that, when executed by the processor, cause the processor to perform operations comprising:
        receiving an image captured by a visual inspection device that is related to a scene including an asset under inspection;
        receiving configuration and position data representing conditions under which the image is captured by the visual inspection device, the conditions including a predetermined position of the visual inspection device with respect to the asset, a predetermined light intensity of a light source associated with the visual inspection device, and a predetermined degree of zoom of the visual inspection device;
        receiving a selection of at least two points of interest within the image;
        generating instructions containing commands operative to actuate an actuator of the visual inspection device for positioning the visual inspection device during articulation along an articulation path extending from one to the other of the at least two selected points in the image;
        generating an inspection template including the set of instructions, the predetermined light intensity; and the predetermined degree of zoom; and
        executing the inspection template, the executed inspection template causing,
            the actuator to position the visual inspection device at the predetermined position;

the visual inspection device to adopt the predetermined degree of zoom;

the light source to emit light at the predetermined light intensity, and the actuator to actuate the visual inspection device to move along the articulation path in a first direction, with the predetermined degree of zoom and predetermined light intensity, after being positioned at the predetermined position.

9. The system of claim 8, wherein the operations further include acquiring one of a still image and a video after the actuating.

10. The system of claim 8, wherein the visual inspection device is one of a pan-tilt-zoom camera and a videoscope.

11. The system of claim 8, wherein the inspection template further includes instructions associated with manually navigating the visual inspection device to the predetermined position.

12. A non-transitory computer-readable storage medium including instructions that when executed by a processor, cause the processor to perform operations comprising:

receiving an image captured by a visual inspection device that is related to a scene including an asset under inspection;

receiving configuration and position data representing conditions under which the image is captured by the visual inspection device, the conditions including a predetermined position of the visual inspection device with respect to the asset, a predetermined light intensity of a light source associated with the visual inspection device, and a predetermined degree of zoom of the visual inspection device;

receiving a selection of at least two points of interest within the image;

generating instructions containing commands operative to actuate an actuator of the visual inspection device for positioning the visual inspection device during articulation along an articulation path extending from one to the other of the at least two selected points in the image;

generating an inspection template including the set of instructions, the predetermined light intensity; and the predetermined degree of zoom; and;

executing the inspection template, the executed inspection template causing, the actuator to position the visual inspection device at the predetermined position;

the visual inspection device to adopt the predetermined degree of zoom;

the light source to emit light at the predetermined light intensity, and the actuator to actuate the visual inspection device to move along the articulation path in a first direction, with the predetermined degree of zoom and predetermined light intensity, after being positioned at the predetermined position.

13. The non-transitory computer-readable storage medium of claim 12, wherein the operations further include acquiring one of a still image and a video after the actuating.

14. The non-transitory computer-readable storage medium of claim 12, wherein the operations further include incorporating the inspection template in a menu-directed inspection (MDI) application.

15. The non-transitory computer-readable storage medium of claim 12, wherein the inspection template further includes instructions associated with navigating the visual inspection device to the predetermined position.

16. The method of claim 1, wherein the selection of at least two points of interest within the image is a user selection received by a graphical user interface (GUI) associated with a human machine interface (HMI) of the visual inspection device.

17. The system of claim 8, wherein the selection of at least two points of interest within the image is a user selection received by a graphical user interface (GUI) associated with a human machine interface (HMI) of the visual inspection device.

18. The system of claim 8, wherein the asset is a turbine and the executed inspection template further causes a turning tool to rotate a core of the turbine concurrently with actuation of the visual inspection device.

19. The non-transitory computer-readable storage medium of claim 12, wherein the asset is a turbine and the executed inspection template further causes a turning tool to rotate a core of the turbine concurrently with actuation of the visual inspection device.

20. The system of claim 8, further comprising the visual inspection device.

\* \* \* \* \*